United States Patent Office 3,306,835
Patented Feb. 28, 1967

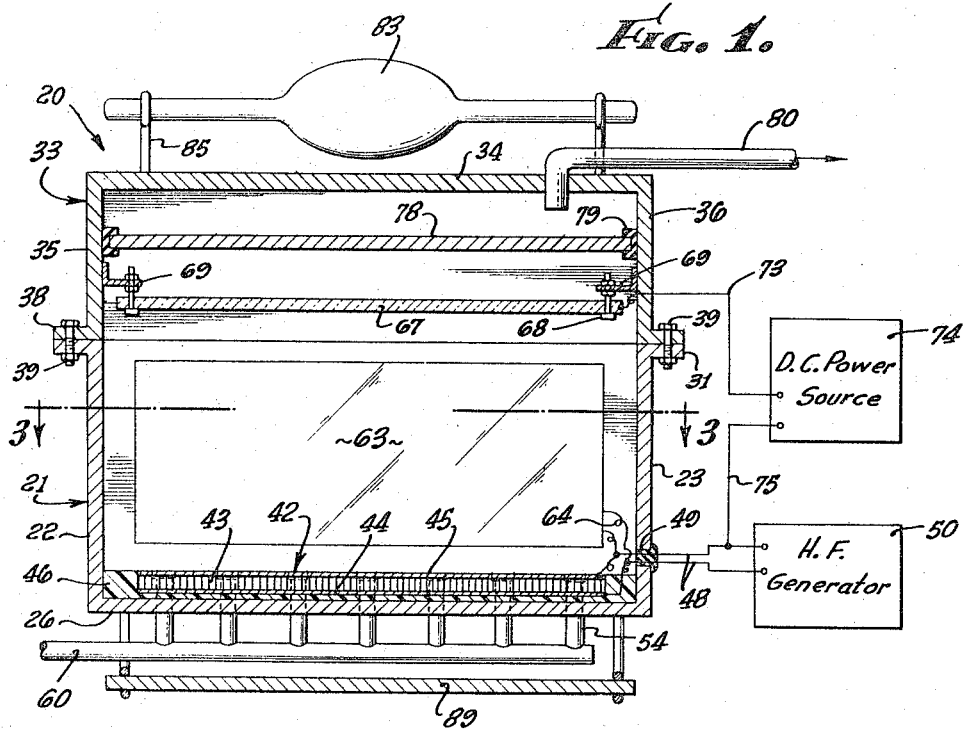

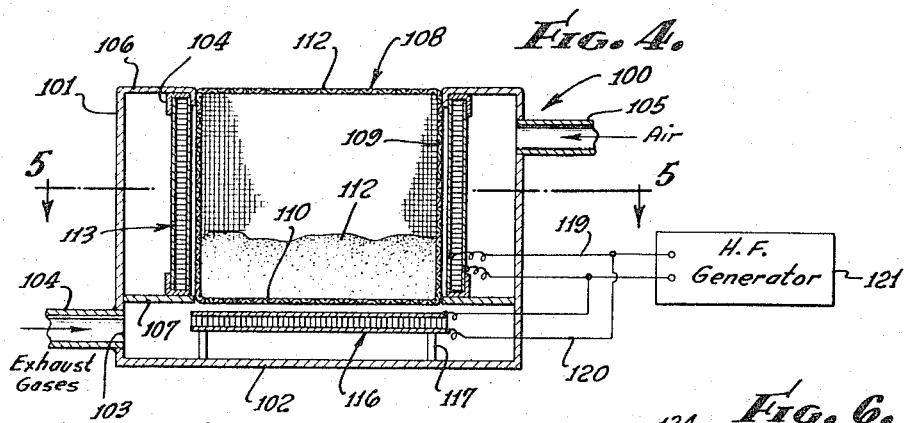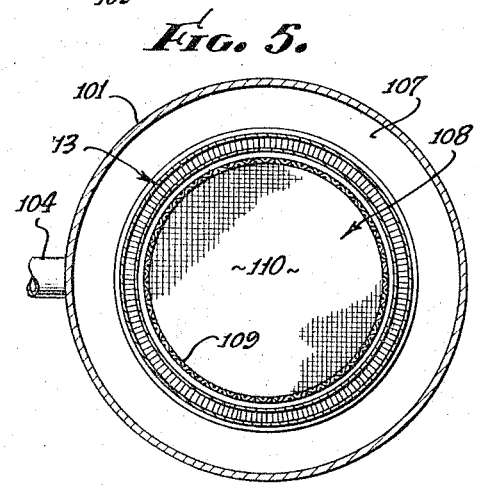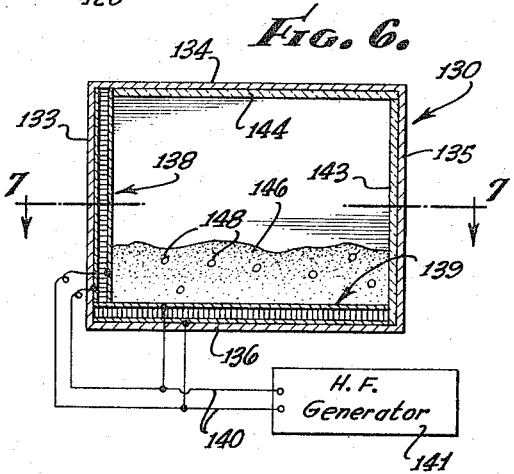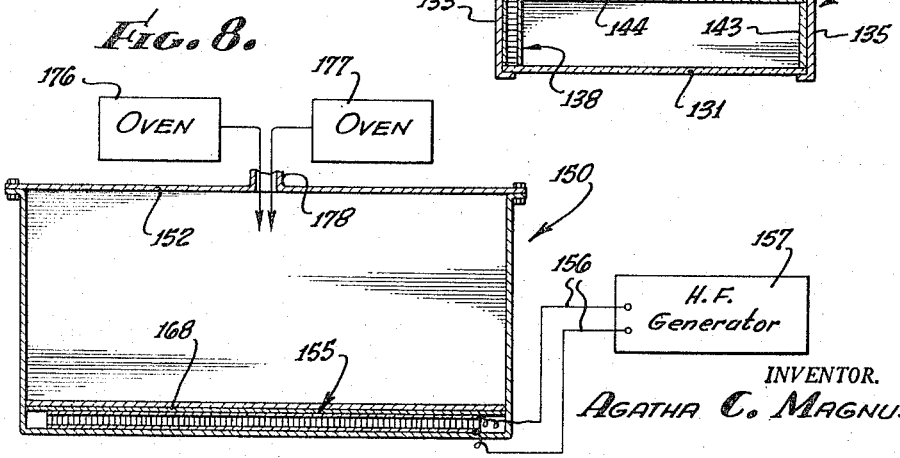

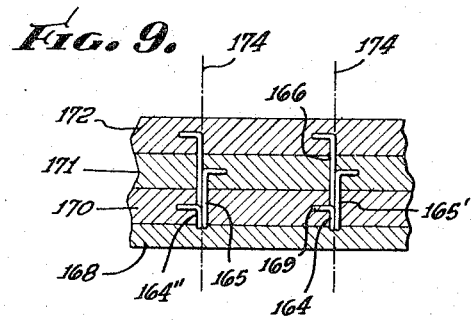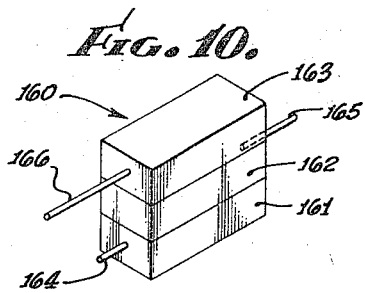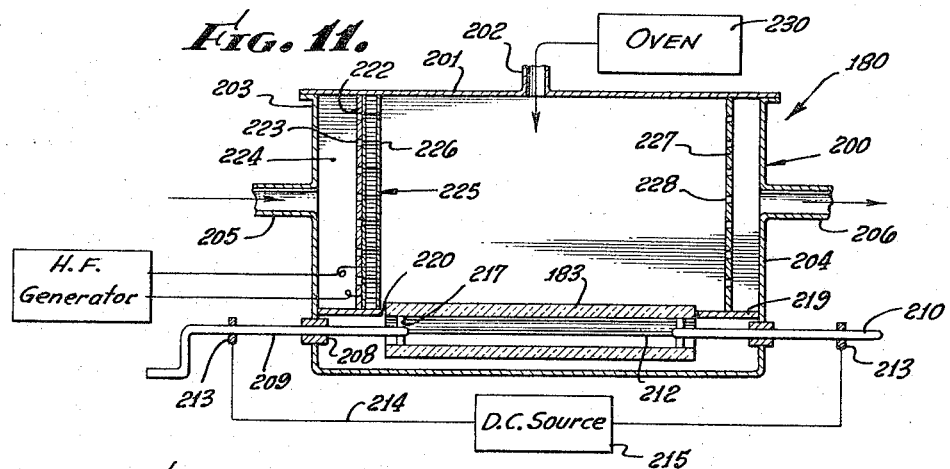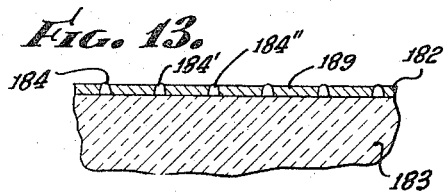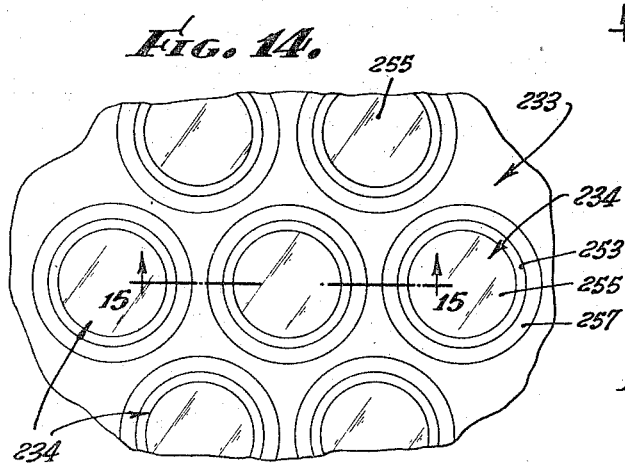

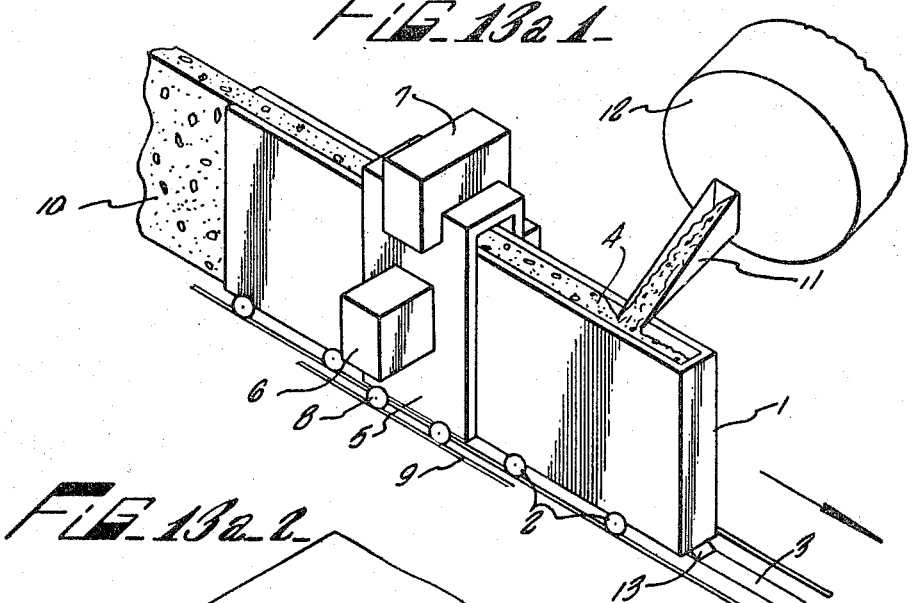
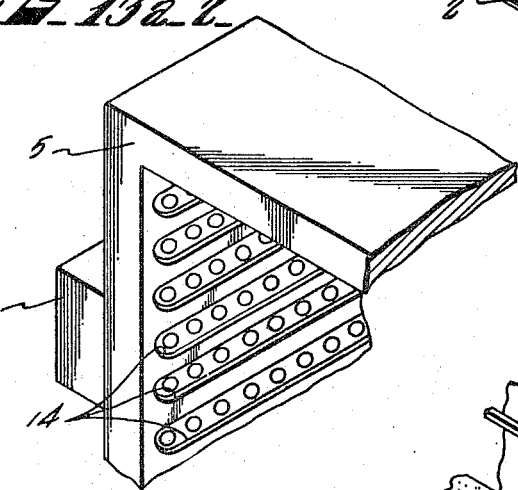
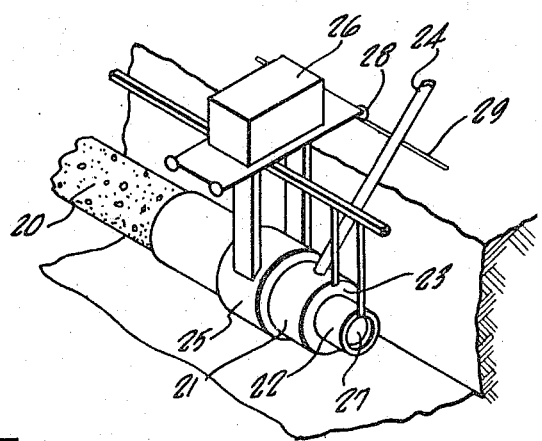
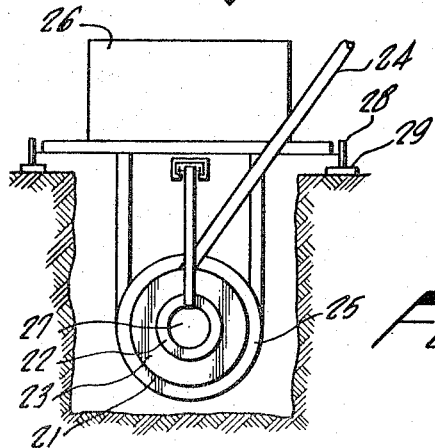

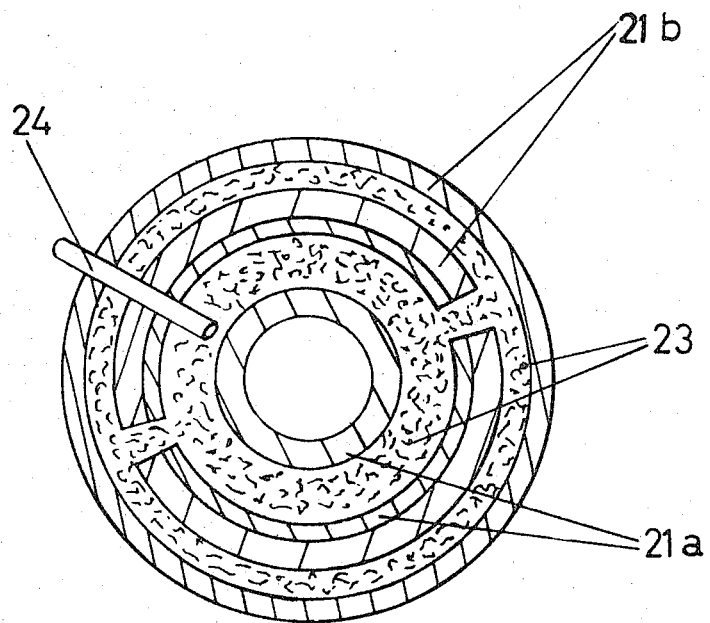

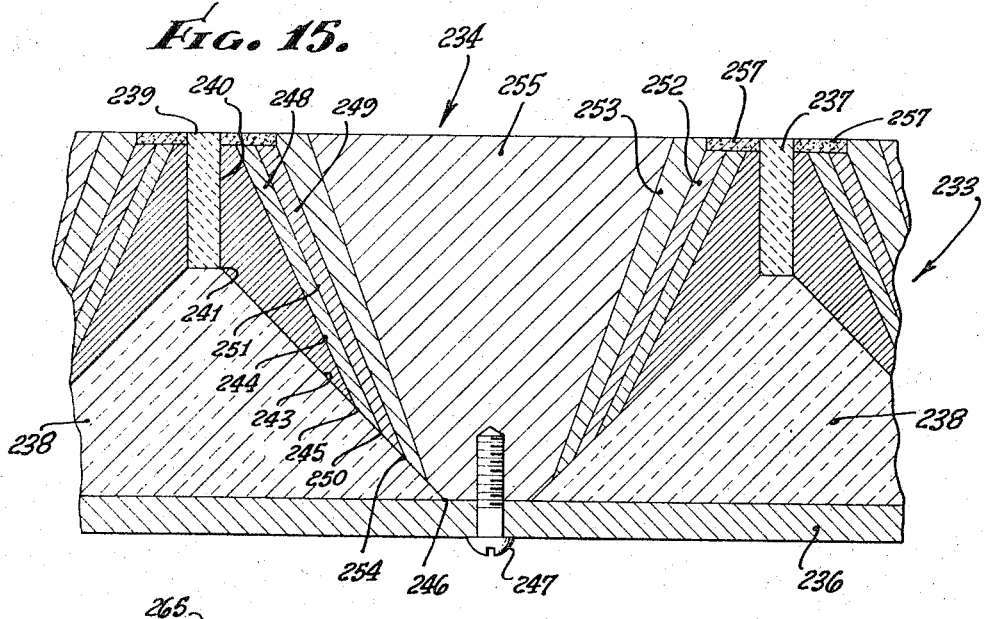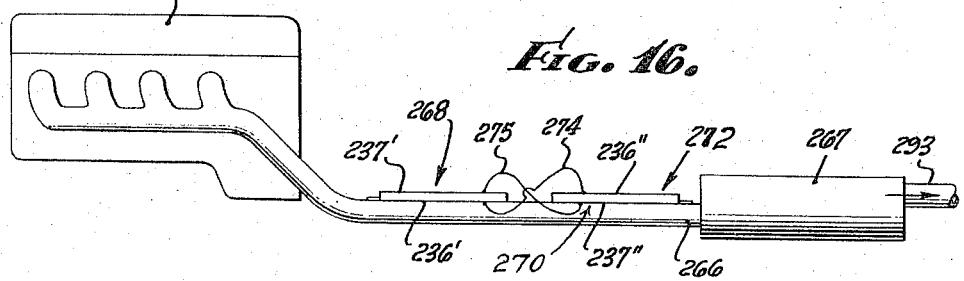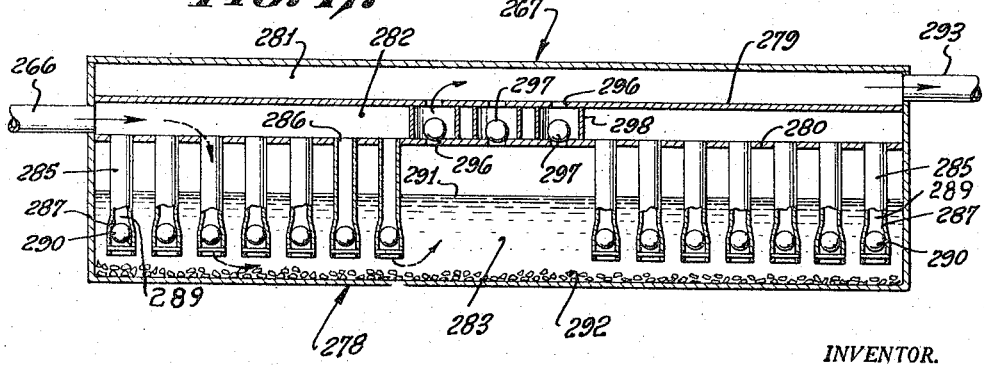

3,306,835
TREATMENT OF SUBSTANCES WITH ULTRA-
SONIC VIBRATIONS AND ELECTRO-MAG-
NETIC RADIATIONS
Agatha C. Magnus, 430 La Loma Road,
Pasadena, Calif. 91105
Filed Feb. 4, 1965, Ser. No. 430,793
7 Claims. (Cl. 204—157.1)

This application is a continuation-in-part of application Serial No. 811,496, filed May 6, 1959, now Patent No. 3,184,400. The invention of the instant application relates to a method of subjecting substances to a three-dimensional pattern of electro-magnetic radiations and of ultrasonic waves and of combinations of such ultrasonic and electro-magnetic lattices for causing chemical combinations, crystallization, polymerization, electrical stressing, formation of p and n type semi-conductor crystals, change of state, and selective distribution of substances. The invention further relates to apparatuses employing the method of this invention of the instant application.

The geometrical configuration and hence certain characteristics of all chemical bodies, i.e. inorganic substances such as metals, dielectrics and semiconductors, and organic substances (e.g. plastics), and inorganic and/or organic semiconductors and catalysts, depend on proportional distribution in their structure of the three different types of bonds, i.e. the covalent, the covalent metallic, and the ionic bond. According to this invention, the configuration of substances is controlled and ordered by means of building into space a "wave-crystal" or "three-dimensional lattice," of standing waves, either electro-magnetic or ultrasonic or with standing waves of concerted wave-lengths of both electro-magnetic and ultrasonic waves, providing nodal points which will also be the points of maximum stability of corpuscles, molecules, atoms and electrons. In the present state of the art, it may not be possible to create all types of such lattices with nodal points being established exactly at the desired positions of the particles of the substances to be treated or formed, but the lattices which may at present be created are sufficient to accommodate any unstable constituents of a molecule and a sufficient number of stable constitututents thereof to enable reproduction of a configuration for the substance to be formed.

A lattice of electro-magnetic radiation, e.g. X-rays will provide a wave-crystal having the requisite atomic distances from node to node thereof, will provide internal and external ionization fields which can tear molecules, atoms and electrons out of their bonds and force them into new bonds, and will provide bonding charges.

A three-dimensional lattice of ultrasonic waves will provide phonons (vibrational heat of a chemical body) and traps (energy freed by donors and acceptors) and mechanical and electrical stresses, and causes bunching and friction of particles, molecules, atoms and electrons against one another, thereby to order and hasten alignment and mating of the particles, molecules etc., as is required microscopically and macroscopically, for example in polymerization. Also in the case of triboluminescent materials such bunching and friction of particles causes light. By this invention it is possible to form new chemical compounds and to more easily produce existing compounds. Certain chemical reactions may be inhibited according to this invention. This invention may be adapted to produce light, called "cold light," by a means employing the phenomenon of triboluminescense. Semiconductors may be formed according to this invention. Selective distribution of powders and aggregates as, for example, distribution of magnetic needles and manufacture of crystals for the mosaics which are described in my Patent No. 3,142,561, may be controlled by this invention. Also it is possible by this invention to form mosaics for Peltier heat pumping and electricity generating effects.

In this specification the particulars of these methods of this invention and the details of construction and mode of operation of apparatus embodying this invention are described with reference to the accompanying drawings, in which:

FIGURE 1 is a central vertical section through an apparatus embodying this invention and especially adapted for subjecting substances to an electro-magnetic and ultrasonic lattice of this invention for forming chemical compositions;

FIGURE 2 is a detail section of a portion of the apparatus;

FIGURE 3 is a transverse section through the apparatus taken on line 3—3 of FIG. 1;

FIGURE 4 is a central vertical section through a muffler of this invention;

FIGURE 5 is a cross section taken on line 5—5 of FIG. 4;

FIGURE 6 is a central vertical section through an apparatus of this invention adapted to produce light by the phenomenon of friction (triboluminescense);

FIGURE 7 is a cross section taken on line 7—7 of FIG. 6;

FIGURE 8 is a schematic representation of an apparatus forming semiconductors according to this invention, a certain tank of the apparatus being shown in central vertical section;

FIGURE 9 is a detail section through a portion of the tank of FIGURE 8;

FIGURE 10 is a perspective view on an enlarged scale of a transistor as formed by the apparatus of FIGURE 8;

FIGURE 11 is a diagrammatic representation of an apparatus for forming mosaic panels according to this invention, a tank of such apparatus being shown in central vertical section;

FIGURE 12 is a plan view on an enlarged scale of a portion of a mosaic panel;

FIGURE 13 is a cross section taken on line 13—13 of FIG. 12;

FIGURES 13a1 and 13a2 show an assembly of apparatus for treating substances to create precisely designed prestressed concrete members which are three-dimensional embodiments of the mosaic of which FIGURE 13 is a cross section;

FIGURES 13a1 and 13a2 illustrate the apparatuses for creating members of rectangular cross section and indefinite extension;

FIGURES 13b1 and 13b2 show the apparatus for the creation of circular, hollow pipe in cross section;

FIGURE 13b3 shows the cross section of apparatus for forming vacuum insulated pipes;

FIGURE 14 is a plan view on an enlarged scale of a portion of another mosaic panel of this invention;

FIGURE 15 is a cross section on an enlarged scale taken on line 15—15 of FIGURE 14;

FIGURE 16 is a diagrammatic view of an exhaust gas system for an internal combustion engine employing mosaic panels of the type shown in FIGURES 14 and 15;

FIGURE 17 is a central vertical section on an enlarged scale through a gas filter of the system of FIGURE 16.

According to this invention new chemical compounds may be formed in a space lattice of crossed electro-magnetic radiations and ultrasonic vibrations as described hereinafter. In FIG. 1 of the drawing there is shown an apparatus of this invention for forming hexafluorobenzene according to the following chemical equation:

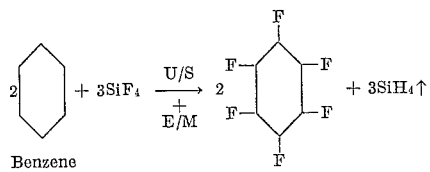

Benzene

The above equation represents the reaction of a mixture of liquid benzene and silicon tetrafluoride when subjected to ultrasonic vibrations (abbreviated as U/S) and electromagnetic waves (abbreviated as E/M), according to this invention, to form hexafluorobenzene. This new compound (hexafluorobenzene) is a non-fusible, translucent, solid, three-planar polymerization product, insoluble in any known solvents. It has a tensile strength of at least 2,000 p.s.i., and is extremely hard. As examples of its uses, it may be used to form electrets (the electric analogue of a magnet), self-lubricating gears, and apparatus for extremely high temperatures.

In FIGURES 1–3 of the drawing there is shown an apparatus designated generally by reference numeral 20 adapted to form hexafluorobenzene according to this invention. The apparatus comprises a box-like container having an end wall 22, 23 side walls 24 and 25, and bottom wall 26. The end walls and bottom wall and side wall 24 of the container 21 may be formed of any suitable material, e.g. steel. Side wall 25 comprises a narrow rectangular frame portion 27 defining an opening which is spanned by a plate 28 of polished steel, the plate 28 being secured to the inside of the frame 26 as by means of an angle iron 29 which is welded or otherwise suitably secured to the inside of frame portion 27. There is a flange 31 extending outwardly from and around the top rim of the end and side walls of the container for mounting a cover 33 upon the container 21. The cover comprises a top wall 34, and walls 35 and 36 and side walls, there being peripheral flange 38 extending outwardly from the rim of the walls of the cover for securing the cover upon the container as with bolts 39.

Upon the inside surface of the bottom wall 26 there is an ultrasonic transducer means 42 for emitting ultrasonic waves upwardly in the container. In the illustrated embodiment the transducer means comprises a multitude of separate piezoelectric crystals 43, e.g. barium titanate crystals. The crystals are secured upon an electrode plate 44 and upon the opposite end of the crystals 43 is another electrode plate 45. The assembly of crystals disposed between the electrode plates is adhered to and electrically insulated from the inside surface of the bottom wall 26 by means of a layer 46 of non-conducting material, e.g. plastic. The electrode plates 44 and 45 are connected to leads 48 passing through seals 49 in the end wall 23, the leads being connected to the terminals of a high-frequency alternating current generator represented at 50.

The bottom wall of the container has a plurality of uniformly spaced apart openings 53 extending therethrough and these openings continue through the transducer means 42 for receiving pipes 54 whereby a gas, in this case, the silicon tetrafluoride may enter the container. Each pipe 54 has an enlarged cup-shaped upper end 55 for accommodating a head 56 of a poppet valve having a stem 57 extending axially in the pipe. The stem is pivotally connected to a lever 58 which extends through a suitable seal 59 formed in the pipe below the bottom wall of the container whereby the poppet valve may be opened or closed by lowering or raising the outer end of the lever. The lower ends of the pipes 59 are connected to a manifold 60 by which the silicon tetrafluoride is caused to flow into each of the pipes 54.

The openings 53 are covered by filters which allow only bubbles of about 0.5 micron to enter the liquid, so that their internal pressure causes them to dissolve immediately upon entry.

Upon the inside surface of the side wall 24 of the container is another transducer layer 63 which is similar to the transducer means 42 on the bottom wall of the container except that the transducer means 63 does not have any openings extending therethrough such as the openings 53 for accommodating the pipes 54. The electrodes of the transducer layer 63 are connected by leads 64 to the leads 48 and 49 whereby the transducer crystals of the layer 63 will be excited simultaneously with the excitation of the crystals of the transducer layer 42. In the illustrated embodiment the plane of the transducer layer 42 is perpendicular to the plane of the transducer layer 63 and the container in which these transducer layers are mounted is of such dimensions that the ultrasonic waves which are emitted from the layer 63 will cross the ultrasonic waves from the transducer layer 42 at the nodes of the respective waves.

The plate 26 which forms the greater part of the side wall 25 of the container is parallel to the plane of the transducer layer 63 and is spaced from the transducer layer 63 by a distance which is a whole number multiple of the wave length of the ultrasonic waves emitted by the transducer layer 63 whereby the plate 28 will serve as a reflector for the waves from transducer layer 63. Thus the reflected waves will be in phase with the emitted waves whereby standing waves of ultrasonic vibrations between the transducer layer 63 and the steel reflector plate 28 will be created.

For reflecting the ultrasonic waves emitted by the transducer layer 43, there is another plate 67 of polished steel extending transversely of the cover 33 and mounted on the inside thereof by means of adjustable fasteners or bolts 68 on insulator lugs 69, being welded or otherwise suitably secured to the insides of the walls of the cover.

As in the case of the reflector 28, the reflector plate 67 is spaced from the transducer layer 42 by a distance which is a whole number multiple of the wavelength of the ultrasonic vibration emitted by the transducers of the layer 42 thus to create standing waves between the reflector plate 67 and the bottom transducer layer. Both plates 28 and 67 are adjustable for perfect tuning to allow for temperature and consistence of the processed material.

The reflector plate 67 is connected by lead 73 to one terminal of a direct current power source 74. Another lead 75 from the power source is connected to the electrode plate 45 for creating an electrostatic field in the container between the electrode plates 67 and 45.

Above the reflector-electrode plate 67 is a membrane or sheet 78 which spans the inside of the cover, the sheet 78 being secured around its periphery to the insides of the cover walls by seal 79. The membrane 78 is one in which gases are selectively soluble.

For forming hexafluorobenzene according to this invention, the sheet 78 may be formed of tetrafluoroethylene (Teflon) which is permeable to monosilane but impermeable to silicontetrafluoride.

Thus when the chemical reaction referred to above proceeds, the reactant tetrafluoride will remain in the container and will not pass through the membrane 78, whereas the resultant monosilane ($SiH_4$) will permeate through the membrane 78 and be exhausted through an outlet 80.

For creating a lattice formation of electromagnetic waves within the container, the illustrated embodiment employs X-ray tubes 83 and 84, one of which is mounted as with brackets 85 above the top wall 34 of the cover and the other X-ray source 84 being mounted as with bracket 86 to the side wall 25 of the container whereby the radiations emitted from each of the sources will cross each other. The X-ray tubes are so disposed with respect to each other that their respective radiations will cross at the nodes thereof. Also the above mentioned lattice of ultrasonic waves from the transducer assemblies 42 and 63 is so created with respect to the lattice of the X-rays that the nodal points of wave crossings in the ultrasonic lattice will be disposed at the nodal points of crossings in the electro-magnetic lattice produced by the X-ray tubes. The wavelengths of the X-rays are substantially shorter than the wavelengths of the ultrasonic waves, and accordingly, each point of crossing in the electromagnetic lattice will not have a corresponding point of crossing in the ultrasonic lattice. For the purpose of this invention the ultrasonic waves are generated such that their wavelengths are whole number multiples of the wave length of the X-rays whereby the points of crossing in the ultrasonic lattice will occur only at points of crossing in the electromagnetic lattice.

It is desirable to provide barriers for limiting the extent to which the X-rays are emitted beyond the apparatus, and to this end, a lead plate 88 is mounted upon the outside of wall 24 to serve as a barrier for X-rays emitted by tube 84, and another lead plate 89 is mounted below the bottom wall 26 to serve as a barrier with respect to the rays emitted by tube 83.

To form hexafluorobenzene by the apparatus 20, according to this invention, the container 21 is filled with liquid benzene and the cover 33 is then sealed tight upon the container. The X-ray and ultrasonic lattices described above are then established by energizing the power source 50 and the X-ray tubes. Silicontetrafluoride is then bubbled into the benzene through the manifold 60 and up through the pipes 54. The energy required for the addition of fluoride atoms to the benzene is supplied by the electromagnetic lattice and the phonons are supplied by the ultrasonic lattice. Because the ultrasonic lattice is superimposed upon the electromagnetic lattice, falling at points of crossing in the electromagnetic lattice, the ultrasonic waves will cause the molecules of hexafluorobenzene, which are being formed, to become arranged with respect to each other so as to fit together perfectly with each surface or side of each molecule being matched with corresponding sides, respectively, of the next adjacent molecules. When it becomes apparent, by viewing through an inspection port, in a wall of the container, that the hexafluorobenzene is polymerizing, the wave lattices may be discontinued, for the reaction will continue to completion. After the supply of silicontetrafluoride has been shut off as by closing the inlet valves through operation of levers 58, the cover 33 may be removed for access to the solid product. Wall 23 may be an extrusion die covered by a sealing plate which is removed while the compound is still plastic. Wall 22 may have an actuating cylinder which may be operated to force the plastic material through a die or into molds. Though the illustrated apparatus contains but two X-ray tubes, it is to be understood that any convenient number thereof may be employed outside each of the walls 24, 25. Also, for forming compounds of different crystalline structure the lattices may be tilted as by increasing the angle of the transducer layer 63 with respect to the transducer layer 42.

The illustrated apparatus 20 is further adapted to impart electret properties to the product while the same is being formed, i.e. the crystals of the hexafluorobenzene are electrically stressed to acquire polarization. As the molecules of hexafluorobenzene are being formed, the plates 67 and 45 are energized by a strong electric field produced by the direct current powersource 74 to orient the molecules in the direction of the field.

When hexafluorobenzene with electret qualities has been produced in sufficient quantaties, the apparatus 20 can be formed of this material, so that its walls can be agitated ultrasonically by electrostriction, whereby no transducers are required.

According to this invention it is possible to create "Cold Light," by subjecting triboluminescent substances to a three-dimensional lattice formation of ultrasonic and electromagnetic waves.

In FIGURES 6 and 7 of the drawings, there is shown an apparatus, designated generally by reference numeral 130 for producing such light for ornamental or other desired purposes.

Apparatus 130 comprises a hollow hermetically sealed rectangular box-like structure having front and rear panels 131 and 132 and four end walls 133 and 136, respectively. At least one of the panels 131 and 132 is formed of translucent material, e.g. hexafluorobenzene which has been turned into electret quality material by stressing as previously described or of other electrically radiant material which is translucent, such as coated glass or quartz. Upon end wall 133 there is mounted a transducer assembly 138 which is substantially identical to the transducer assembly 42 hereinabove described in detail. Also on the inside of end wall 136 there is another transducer assembly 139. The transducer assemblies are connected by leads 140 to a high frequency generator represented at 141.

Opposite the end wall 133 there is a reflector plate 143 of glass or quartz, and a similar reflector plate 144 is secured on the inside of end wall 134. If desired, the reflector plates 143 and 144 may be formed to constitute the end walls 134 and 135, respectively. The spacings between opposite end walls in the apparatus are whole number multiples of the wave length of the ultrasonic waves whereby a three-dimensional lattice of waves having points of crossing at the nodes of the waves will be formed within the apparatus, as has been described hereinbefore and this ultrasonic lattice will have superimposed upon it the electric field emanating from the electret fluorobenzene walls of the apparatus. An electret is a permanent electric analogue to a magnet. Within the apparatus is a quantity of triboluminescent powders of about one micron size, e.g. activated zinc sulfide, quartz, sugar crystals (very weak) and calcium chloride. The powders are designated by reference numeral 146. Also contained within the apparatus is a quantity of small spheres 148 of semiconductor materials, e.g. organic cyanides, naphthalene and benzothrone, and metallic semi-conducting alloys. The spheres 148 can also be in part consisting of Lucite or any transparent plastic.

Upon energization of the transducer assembly, the lattice of ultrasonic waves will cause distribution of the triboluminescent particles throughout the inside of the apparatus and will agitate the spheres 148 rubbing them against one another to produce cold light by friction between the spheres and the triboluminescent powders without any great rise in temperature. This fact of maintaining a relatively low temperature, makes this invention important for fog repulsion in air ports at the same time as extensive lighting walls can be created out of the apparatus. The ultrasonic agitation of the whole apparatus will act on surrounding fog and dissolve it into droplets. Strangely enough this disposition can also serve as a lense for electro-magnetic microwaves which is adjustable at will.

Referring now to FIGURES 8 to 10, there is illustrated an apparatus, designated generally by reference numeral 150, designated for forming semi-conductors for transistors, according to the concepts of this invention.

Apparatus 150 comprises a tank 151 formed of for example zirconia or any material resistant to heat, having a lid 152 sealed on the tank as by bolted flanges 153 to close the tank. Upon the bottom wall of the tank is an ultrasonic transducer assembly 155 of a structure similar to that described hereinbefore for the transducer assembly 42. The transducers may be of zirconium zincide or gallium arsenide, for example, which keep their piezo-electric qualities at high temperatures. The assembly 155 is connected by leads 156 to a high frequency alternating generator represented at 157. The apparatus 150 is described herein as the same may be used for manufacturing semiconductor transistors 160 (FIGURE 10) of semiconductor non-stoichiometric alloys, for example gallium arsenide as well as the mosaic of the applicant's Patent 3,142,561.

The illustrated transistor of FIGURE 10 comprises an emitter layer 161 of negative or n-type character, a base layer 162 of positive or p-type, and a collector layer 163 corresponding to layer 161, i.e. of n-type. Alternatively, the outside layers may be of p-type material and the middle (base) layer of n-type material. The emitter layer has a wire terminal 164 of beryllium-copper, for example, of about .0015" diameter attached thereto. The base layer has a wire terminal 165 of gold, for example, of about .0015" diameter attached thereto, and the collector layer has a wire terminal 166 of Phosphor bronze, for example, attached thereto, the several terminals serving to connect the transistor in an electronic circuit as is well understood by those skilled in the art.

To form the transistor 160 in controlled mass production with the use of apparatus 150, a thin support sheet 168 of zirconia or asbestos, but, if available, of electret hexafluorobenzene, preferably, of about one-half inch in thickness is placed upon the top of the ultrasonic transducer assembly 155. Referring to FIGURE 9, it will be seen that the sheet 168 has a plurality of terminal wires projecting upwardly therefrom. The terminal wires are arranged in rows on the sheet 168 so that after the transistor layers 170, 171 and 172 are formed upon the sheet, they may be cut along the rows of the terminal wires secured to the respective layers of each transistor. Wire 164 extends upwardly from the sheet 168 and is bent at the end portion 169 thereof at a level corresponding to about the medial plane of the layer 170 to be formed, the layer 170 providing the emitter layer 161 of the plurality of transistors 160 to be formed. Wire 166 extends up to a level at which the layer 172 (for collector layer 163 of the transistors) will be formed and wire 165 extends up to about the middle for layer 171 (for base layer 162). After the three layers for the transistors are formed, as described hereinafter, the sheet 168 with the transistor layers on it is removed from the tank so that the transistor layers together may be stripped from the sheet. The layers are then cut through along lines 174 to form the individual transistors. The stem portions of the terminal wire may then be bent out from the end surfaces of the transistors, as shown in FIGURE 10.

Reference numeral 176 designates an oven for sublimating gallium and numeral 177 designates another oven for sublimating arsenic. It is well understood that two other elements of the III and V columns of the Periodic Table in non-stoichiometric proportion, as well as alloys of other elements which form semiconducting alloys, can be treated in the apparatus of this invention.

The gaseous gallium from oven 176 and the gaseous arsenic from oven 177 are passed through an opening 178 formed in the lid of apparatus 150. These gases will solidify as a gallium-arsenide semi-conductor layers 170 upon the electret sheet 168. A homogeneous mixture of the gallium and arsenic results from agitation of the gaseous molecules produced by the waves emitted from the ultrasonic transducer assembly 155. As the p or n types of a semiconductor material such as the non-stoichiometric alloy gallium arsenide depends on the slight displacement of the stoichiometric proportion of the two materials, in the first case towards a preponderance of gallium, in the second, the n type, towards a preponderance of arsenic, it has been established that a slower rate of solidification favors the formation of n-type material, whereas a faster rate of solidification favors the formation of p type semiconducting material. This rate of solidification can be controlled by the duration of the ultrasonic agitation by the transducer assembly 155. Its duration will be longer, if n type material is desired and shorter if a p-type layer is desired. An electret stress may be imparted to the transistors during solidification of each layer as by means of spaced electrode plates as mentioned herein before.

Referring to FIGURES 11, 12 and 13 of the drawing there is shown therein an apparatus, designated generally by reference numeral 180, for forming a photo-electromagnetic mosaic according to Patent No. 3,142,561, issued on July 28, 1964, and according to the present invention.

The illustrated mosaic panel or drum comprises a mosaic film 182 upon the outside surface of a quartz tube 183. The mosaic film 182 comprises a series, extending from end to end of the tube, of axially spaced apart rows 184, 184' and 184" etc. of dendrites 185, the rows encircling the quartz tube. The spaces between adjacent rows of dendrites are designated by numeral 187. After the rows of dendrites have been deposited upon the quartz tube, a layer 189 of semiconductor material, e.g. gallium arsenide, is deposited in a manner as described above in the description of apparatus 150. Following deposition of the semiconductor layer 189, the same is machined down to the level of the dendrites, thereby to expose the dendrites on the outside surface of the mosaic.

Apparatus 180 comprises a tank 200 of rectangular cross section having a lid 201 with an opening 202. Opposing side walls 203 and 204 of the tank have inlet opening 205 and outlet opening 206 formed therein, respectively, for passing an inert gas, e.g. nitrogen, through the tank. Above the bottom wall of the tank, the side walls 203 and 204 have sealing bearings 208 for rotatably supporting steel rods 209 and 210 extending through the walls. The inner ends of the rods are interconnected by the electric wire 212 which may be insulated with fiber glass impregnated with phosphates (e.g. Hotrock), for example. Slip rings 213 upon the outer end portion of the rods are connected through leads 214 to a source of direct current. Also upon the inner ends of the rods 209 and 210 are spider supports 217 for mounting the quartz tube 183 within the tank. A partition 219 within the tank defines an opening 220 exposing the quartz tube. A wall 222 having gas passageways 223 formed therein is spaced inwardly from the side wall 203 thereby defining a manifold chamber 224 for passage of the cooling nitrogen gas into the tank.

Upon the inside of the wall 222 is a transducer assembly 225 corresponding to that described above for the transducer assembly 42 of the apparatus of FIGURE 1. The transducer assembly 225 has openings 226 formed therein and aligned with the openings 223 in the wall 222 to allow passage of the cooling gas through the transducer assembly.

Spaced inside the side wall 204 is a polished steel plate 227 having openings 228 to allow exhaust of the cooling gas. The plate 227 serves as a reflector for the ultrasonic waves emitted by the transducer assembly 225 thereby to form standing waves between the transducer assembly 225 and its reflector 227. Another side wall of the tank has a transducer assembly secured on the inside thereof to direct ultrasonic waves to its opposite wall thereby to form standing waves extending transversely of the waves produced by assembly 225. A lattice of crossed standing waves is thus produced as described hereinbefore for FIGURE 1, with waves crossing each other at their nodes. The electromagnetic lattice of FIGURE 1 is provided here by the direct current flowing through wire 212 inside the quartz tube.

For forming the dendrites, sublimated iron alloy is introduced into the tank through opening 202 from an oven represented diagrammatically at 230. As the gaseous iron enters the tank, it will be agitated by the ultrasonic lattice and cooled by the gas passing through the tank with the result that the dendrites 185 will form and become deposited upon the hot outside surface of the quartz tube 183. The quartz tube will have a thin outside film of molten quartz due to the heat within the tank and the dendrites will therefore stick to the outside surface of the tube. As the dendrites are deposited they are subjected to the influence of the magnetic field created by the wire 212 and will become aligned in spaced apart rows, also as a result of the ultrasonic agitation, as the quartz tube is rotated by the rods 209 and 210. Inasmuch as the dendrites are formed in the ultrasonic lattice while being subjected to the influence of the magnetic field produced by the current passing through the wire 212, the dendrites will become permanently magnetized. For a fuller description of the nature of the dendrites employed herein reference is made to Patent 3,142,561.

After the magnetic dendrites have been deposited in rows upon the surface of the quartz tube, the tube may then be placed in an apparatus such as that of apparatus 150 (FIGURE 8) for depositing the layer 189 of semiconductor material upon the surface of the quartz tube. Following deposition of such semiconductor layer, the surface thereof is machined down to expose the dendrites 185. The tube may be cut into drums for use of mosaics of the type described in applicant's Patent 3,142,561.

If sintered mixed metal and ceramic memories are to be produced, dendrites may be employed, as explained above, but instead of forming a mosaic upon a revolving tube, the same may be formed into a thick layer form intermixed with a ceramic powder e.g., barium titanate, as explained above in connection with the part of the description in which reference is made to FIGURE 11. The ceramic powder is placed in a container and the container is placed on an assembly of transducers as described in FIGURE 1 under 42. The transducers as there disposed will cause standing waves in the container. The heavy dendrites will settle in the nodes of the lattice of ultrasonic waves and the lighter ceramic powders will be moved aside to provide space for the dendrites. When the dendrites have formed a pattern in sufficient numbers, the form is carefully removed and set in a sintering oven, so that the distribution remains undisturbed.

Microscopically identical to the ceramic memory is the concrete as FIGURE 13a1 shows; the manufacture of exactly calculated and predetermined concrete structures, which can replace under any conditions prestressed concrete to great advantage, and as regards resistance to stress, durability and production costs is far superior to the above mentioned prestressed concrete and even allows reinforcement by steel structures in such regions where prestressed cement cannot supply reinforcements.

FIGURE 13a2 shows a cross section of FIGURE 13a1. This contrivance serves to manufacture concrete reinforced by steel elongated particles. The steel particles are introduced well spaced into the concrete while it is still soft and moves into a form 1 from a container 12 over chute 11. The position and orientation of the elongated steel particles is determined on the one hand by the magnetic lines of force of a generator 7 and on the other hand by simultaneously generated harmonic ultrasonic waves generated by the sound generator 14, activated by the power source 6. The ultrasound wave front is at right angles to the magnetic lines of force, so that the position of the elongated steel particles as well as that of the lighter and heavier constituents of the concrete, such as lime, gravel, quartz and fragments of rock, are distributed exactly according to a predetermined pattern. The even heat generated by the ultrasonic waves hastens the chemical processes in the concrete, expells gases so that the concrete becomes closely packed and a long drying time and keeping the concrete moist during setting is eliminated. The concrete does not crack either, as the concrete in form 1 does not cool more rapidly outside than inside. The arrangement of FIGURES 13a1 and 2 serves to produce continuous slabs of concrete. For this purpose form 1 is running on the rail 3 by runners 13 and wheels 2. Above form 1 extends part 5 mounted on wheels 8 and a rail 9, which carries the generators and constituents required for the production of the magnetic and ultrasonic fields 6, 7, and 14. The finished concrete 10 leaves the arrangement, or is left behind by the whole contrivance on the left side of the drawing. The FIGURES 13b1 and 13b2 show a contrivance to produce concrete pipes with remarkable resistance to stress and other attacks as well as chemical destruction. These pipes are free from cracks and are easy to manufacture. The apparatus consists of a generator 26, which creates a magnetic field, the lines of force of the field running along the circumference of the pipe 23. The frame 25 of the form 21 serves to generate by reflection ultrasonic waves, so that the form is now subjected to electro-magnetic and ultrasonic waves at right angles to one another. This is easily recognizable from FIGURE 13b2 which shows a cross section of FIGURE 13b1. The form contains an interior pipe 27, surrounded by an exterior pipe 21, an empty space lying between the two pipes, into which over the shoot 24, a mixture of liquid concrete and steel elongated particles is introduced. Above the form 21 the generator of ultrasonic waves 26 is mounted.

This apparatus can of course be executed in different ways, wherein the principal effects consists in submitting the still liquid concrete containing the randomly dispersed enlongated steel particles to an electro-magnetic and ultrasonic field so that the steel particles orient themselves in the still liquid concrete mixture and assume predetermined placing.

Thus, FIGURE 13b3 shows the manufacture of concrete pipes, which can be laid not only in a straight line, but can be snaked so at to resist earth quakes. The content of these pipes can be protected from either heat or frost and such pipes can be embedded in the North in permafrost.

FIGURE 13b3 contains an inner hollow cylinder 21a and an outer cylinder 21b, both cylinders lying concentrically one to the other. A chute 24 serves to introduce the concrete and steel particle mixture into the hollow space of cylinder 21a. When introducing liquids by the shoot 24 the empty space inside the cylinder 21a is entirely filled. Between the hollow spaces of the inner and outer cylinders linking connections are provided, which permit the concrete to enter the outer cylinder 21b. Such connections and their amount will depend on the conditions of temperature under which the pipe is to function. Between the spaces filled with concrete 23, once the form is filled, there will be hollows which will serve to isolate the contents of the pipe and can be turned either into a ring of insulating vacuums when pumped free of air, or maintained by injected air or any other medium at a predetermined temperature. Thus only the connections between the double pipes are not insulated against the outside temperature.

A flexible magnetic tape may be produced by the process described above for either a ceramic memory or for concrete members. For a flexible tape, however, the dendrites may be deposited on a thin sheet in ribbon or tape form of asbestos, for example, or of hexafluorobenzene. Such tape may be employed, for example, for mounting loose sheets of paper in a notebook cover. One edge of each sheet of paper to be inserted as a page for such a notebook or folder for filing documents will have a magnetic powder strip deposited thereon on one edge, either by engraving, plating, or spraying or in mass-production by mixing magnetic powder into the pulp of a Fournier paper machine and placing the powder according to the description of placing the dendrites in the ceramic of the ceramic memory with, in the pulp, in lines where the large sheets will be cut. For example 500 mesh iron dispersed in a lacquer will easily mix with the pulp when still wet and be placed according to this invention. Paper with an edge impregnated with iron will adhere along this edge to the magnetic film on the inside of the notebook binder or the filing-folder and can be moved without disturbing or removing the other sheets as is the case now in all known notebooks and folders. Cards with magnetic edges can expedite computer operations and can be useful in filing cabinets.

Referring to FIGURES 14 and 15 of the drawing, there is shown a panel designated generally by reference numeral 233 comprising a mosaic of uniformly disposed semiconductor elements 234 formed therein. Panel 233 comprises a laminated strip having an outside rhodium electrode plate 236, a sheet 237 of rhodium as another electrode plate, and a middle layer 238 of beryllium oxide. Extending inward from the outside surface 239 of the sheet layer 237, the laminated panel has a plurality of spaced separate holes 240 formed therein, the same being cylindrical to a depth 241 and then extending to the inside surface 242 of layer 236 as a frusto-conical cone defined by wall 243. Alternatively, the holes 240 may be of polygon cross section for containing the semi-conductor elements.

To form the transistors 234 within the hole 240, as shown in FIGURE 15, the laminated panel is positioned within an apparatus 150 of FIGURE 8. A masking plug (not shown) is placed within each hole 240, each masking plug having outside surfaces thereof corresponding to conical surface 244 down to circle 245 of hole 240, and having a frusto-conical surface on the end portion of the masking plug conforming to the surface of the bore between circle 245 and end 246 where the plug will seat flush on the top surface 242 of the rhodium electrode plate 236. A screw 247 may be employed to secure the plugs in the holes for the transistors.

A layer 248 of n-type semiconductor is then deposited in the panel holes to fill the space between the masking plug and the walls defining the transistor holes. Following formation of an n-type layer 248, a layer 249 of p-type semiconductor is formed to extend down to level 250 using a suitable plug to define the inside surface 251 for the p-type layer. A layer of paraffin is then deposited in the space designated by 252, following formation of the paraffin layer, another layer 253 of p-type semiconductor is deposited to extend down to level 254 short of the electrode plate 236. After p-type layer 253 has been formed, the inside thereof is filled with a truncated cone of n-type semiconductor 255 in contact with the upper surface of the electro-plate 236. It is well understood that alternatively those layers which are p-type semiconductors in above description can be of n-type material and those of n-type material may be then of p-type material. It is also clearly understood that all the depositions of layers described above are effectuated in apparatus according to FIGURES 8 to 11, apparatus 11, 12 and 13, strictly according to the present invention and only feasible by using apparatus according to the present invention.

After the several semiconductor layers have been machined down to the plane of the top surface 239, the mosaic is placed within a chamber to melt out the paraffin layer and to evacuate the space 252 left by the removal of the paraffin and an asbestos ring 257 is inserted between p-type layer 253 and the electrode 237 to seal the evacuated space.

According to this invention, the semiconductors of the mosaic panel 233 will create an electric current between the outside electrodes 236 and 237 when a temperature differential exists between the electrode plates 236 and 237.

Also the mosaic panel 233 will serve as a heat pump for transmitting heat from the electrode layer 237 to the electrode plate 236 when the same are connected in an electrical circuit. It can be used for individual transistor cooling when one complete section is placed at the base of a transistor.

In the employment of these panels as shown in FIGURES 14 and 15 mosaic panels of type 233 are arranged in the conduit with the electrode plate 236' thereof disposed inwardly of the conduit and the electrode plate 237' thereof facing outwardly from the conduit. As the hot exhaust gases flow through the conduit, they will heat the electrode plate 236' to a temperature higher than that of the exposed electrode plate 237' whereby the mosaic will generate an electric current passing between its plates.

Downstream of the generator is a heat pump 270 secured gas tight in the wall of the conduit and consisting of another mosaic panel 272 of identical structure to the mosaic panel 268 for the generator, but having electrode plate 237'' disposed on the inside of the conduit and its electrode plate 236'' exposed to the outside of the conduit. The electrode plate 236' of the generator mosaic panel 268 is connected by a conductor 274 to the outside electrode plate 236'' of the heat-pump mosaic panel 272. Similarly, a conductor 275 electrically connects the outside electrode 237' of the generator panel to the inside electrode plate 237'' of the heat-pump panel. Thus the electric current generated by the mosaic panel 268 will cause current to flow through the mosaic of the heat-pump thereby to extract further heat from the exhaust gases of the conduit, should it be leading from the manifold of a combustion motor. The exhaust gases passing through the conduit would not only generate with their heat enough electricity to cool themselves down further in the conduit, but probably enough electricity would be generated to replace the batteries and radiator of a combustion engine and even serve to air condition its surroundings, by utilizing the waste heat of the internal combustion engine.

The gas filter 267 comprises a closed tank 278 having spaced apart partitions 279 and 280 supported therein. Such partitions divide the tank into an upper chamber 281, a middle chamber 282, and a lower chamber 283. Partition 280 has a plurality of tubes 285 depending therefrom and open in the partition at 286. The open lower end portion 287 of each tube is of enlarged cross section, an area for accommodating valve balls 290 of polyethylene. The balls are movable axially in their respective tube enlargements to seat against and close the valve seats 289 of the steel tubes 285.

The lower chamber 283 is filled with a saturated aqueous solution 291 of ferrous sulfate, e.g. to a level above the level of the lower ends of the tubes 287. Saturation of the ferrous sulfate solution in the lower chamber is maintained by the presence of crystals 292 of ferrous sulfate in the lower chamber. The buoyancy of the balls 290 will cause them to serve as check valves against the lower open ends of their respective tubes 285 thus to allow flow of gases from the middle chamber 282 through the tubes 285 and into the ferrous sulfate solution in the lower chamber. As the exhaust gases pass through the ferrous sulfate solution, certain components thereof, e.g. nitric oxide, will become dissolved in the ferrous sulfate solution. Also those combustion products, as well as the unburnt hydrocarbons, having a boiling point above 25° Centigrade will become dissolved in the ferrous sulfate solution. The harmless gases, the carbon dioxide, for example will pass through the ferrous sulfate solution to pass out through the exhaust tail pipe 293.

For the flow of the exhaust gases from the lower chamber to the upper chamber 281, the partitions 279 and 280 have openings 296 formed therein, there being check valve balls 297 floatable in nipples 298 positioned between the partitions 279 and 280, and disposed around their respective partition openings 286.

It is recognized that departures may be made from the illustrated embodiments and examples referred to herein within the scope of the invention, which is therefore not to be limited to the details disclosed, but is to be accorded the full scope of the appended claims.

What I claim is:

1. Process for treating materials which comprises subjecting said materials to a space lattice of waves from at least two planar sources of ultrasonic radiations being equal in frequency and crossing each other at their nodes, simultaneously subjecting said materials to a second space lattice of intersecting electromagnetic waves fitted into said first mentioned space lattice with some crossing points thereof coinciding with said crossing points of said ultrasonic radiations.

2. Process according to claim 1 where the materials are benzene and silicon tetrafluoride, whereby a fluorocarbon polymer is formed.

3. Process according to claim 2 wherein an electrostatic field is provided during the treatment of the materials whereby an electret is formed from the polymers.

4. Process for forming reinforced concrete members, with reinforcements being arranged to conform to the stresses to which the concrete will be subjected, comprising the steps of subjecting a mixture of concrete and elongated steel particles during formation to a space lattice of waves from at least two planar sources of ultrasonic radiations, said radiations being equal in frequency and crossing each other at their nodes, simultaneously subjecting said mixture to a magnetic field, the lines of force thereof oriented to conform to the anticipated stress pattern of said concrete members, whereby the elongated steel particles are aligned in the direction of the anticipated stress.

5. Process to control the donor or acceptor properties of deposited layers of semiconducting non-stoichiometric alloys by controlling the duration of the ultrasonic agitation imparted to said layers during their deposition from the vapor state in a container filled with an inert gas by a space lattice of crossed ultrasonic waves, said waves originating from two planar sources of equal frequency and crossing at their nodes.

6. Process according to claim 5 first forming magnetic elongated steel particles from steel vapor in an inert gas atmosphere submitted to said ultrasonic lattice and depositing them on a transparent revolving drum threaded by an electrical conductor, the space between said particles which will have come to lie in the magnetic lines around said conductor then being filled with layers of semiconducting alloys according to claim 5.

7. Process for producing cold light which comprises subjecting a mixture of triboluminescent powders and translucent particles to a space lattice of waves from at least two planar sources of ultrasonic radiations, said radiations being of equal frequencies and crossing at their nodes.

References Cited by the Examiner

UNITED STATES PATENTS

| | | | |
|---|---|---|---|
| 2,489,818 | 11/1949 | Roe | 261—121 |
| 2,671,260 | 3/1954 | Jessen et al. | 264—23 |
| 2,777,813 | 1/1957 | Totzek | 204—193 |
| 2,790,729 | 4/1957 | Pettitt et al. | 117—44 |
| 2,919,207 | 12/1959 | Scholzel | 117—106 |
| 3,009,834 | 11/1961 | Hanlet | 117—215 |
| 3,017,852 | 1/1962 | Bauer et al. | 118—49.5 |
| 3,040,539 | 6/1962 | Gaugler | 62—3 |
| 3,165,631 | 1/1965 | Solow et al. | 250—84 |

JOHN H. MACK, *Primary Examiner.*

H. S. WILLIAMS, *Assistant Examiner.*